(12) United States Patent
Feng et al.

(10) Patent No.: US 8,825,855 B2
(45) Date of Patent: Sep. 2, 2014

(54) NON-INTRUSIVE SINGLE SIGN-ON MECHANISM IN CLOUD SERVICES

(75) Inventors: Chen Hua Feng, Beijing (CN); Kai Tang, Beijing (CN); Yun Tao Wang, Beijing (CN); Jian Ming Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 13/584,905

(22) Filed: Aug. 14, 2012

(65) Prior Publication Data

US 2012/0311167 A1 Dec. 6, 2012

Related U.S. Application Data

(63) Continuation of application No. 13/430,746, filed on Mar. 27, 2012, now abandoned.

(30) Foreign Application Priority Data

Mar. 31, 2011 (CN) .......................... 2011 1 0080417

(51) Int. Cl.
*G06F 15/16* (2006.01)
*H04L 29/08* (2006.01)
*H04L 29/12* (2006.01)
*H04L 29/06* (2006.01)

(52) U.S. Cl.
CPC ............ *H04L 61/301* (2013.01); *H04L 67/146* (2013.01); *H04L 61/304* (2013.01); *H04L 67/2814* (2013.01); *H04L 67/2819* (2013.01); *H04L 63/1441* (2013.01); *H04L 67/02* (2013.01); *H04L 63/0815* (2013.01)

USPC ................................ 709/225; 709/229; 726/8

(58) Field of Classification Search
USPC ................................ 709/225, 228, 229; 726/8
See application file for complete search history.

(56) References Cited

U.S. PATENT DOCUMENTS

| | | | |
|---|---|---|---|
| 6,243,816 | B1 | 6/2001 | Fang et al. |
| 6,938,247 | B2 | 8/2005 | Czajkowski |
| 7,010,582 | B1 | 3/2006 | Cheng et al. |
| 7,219,154 | B2 | 5/2007 | Blakley, III et al. |
| 7,509,672 | B1 | 3/2009 | Horwitz et al. |
| 8,099,768 | B2 | 1/2012 | Cheng et al. |

(Continued)

FOREIGN PATENT DOCUMENTS

| | | |
|---|---|---|
| CN | 1196521 A | 10/1998 |
| CN | 1989489 A | 6/2007 |

(Continued)

*Primary Examiner* — Kostas Katsikis
(74) *Attorney, Agent, or Firm* — Cantor Colburn LLP; Vazken Alexanian

(57) ABSTRACT

A method and apparatus for Single Sign-on, wherein the user accesses a platform server and at least one service provider on the platform server. The method includes intercepting a request sent by the user via a client browser and extracting a domain name included in the request. If the domain name is an original domain name of the platform server, a global session ID is generated for uniquely identifying a session between the user and the platform server. A new domain name of the platform server associated with the global session ID is generated and the URL in the request is redirected to a new URL including the new domain name of the platform server. The request, including the new URL of the platform server, is forwarded to the platform server.

11 Claims, 8 Drawing Sheets

(56) References Cited

U.S. PATENT DOCUMENTS

| | | |
|---|---|---|
| 8,255,984 B1 | 8/2012 | Ghostine et al. |
| 2003/0163737 A1 | 8/2003 | Roskind |
| 2005/0015490 A1 | 1/2005 | Saare et al. |
| 2005/0027713 A1* | 2/2005 | Cameron et al. ............... 707/100 |
| 2005/0198501 A1 | 9/2005 | Andreev et al. |
| 2006/0064502 A1 | 3/2006 | Nagarajayya |
| 2006/0218625 A1 | 9/2006 | Pearson et al. |
| 2006/0218628 A1 | 9/2006 | Hinton et al. |
| 2007/0039043 A1 | 2/2007 | Garskof |
| 2007/0294752 A1 | 12/2007 | Kinser et al. |
| 2008/0021997 A1 | 1/2008 | Hinton |
| 2008/0275954 A1* | 11/2008 | Iwatsu et al. ................. 709/205 |
| 2009/0100438 A1 | 4/2009 | Hinton et al. |
| 2009/0260021 A1* | 10/2009 | Haenel et al. ................. 719/328 |
| 2009/0287775 A1* | 11/2009 | Ng et al. ....................... 709/205 |
| 2009/0292800 A1 | 11/2009 | Ng et al. |
| 2011/0078278 A1 | 3/2011 | Cui et al. |
| 2011/0154464 A1 | 6/2011 | Agarwal et al. |

FOREIGN PATENT DOCUMENTS

| | | |
|---|---|---|
| CN | 101997903 A | 3/2011 |
| JP | 2006252418 A | 9/2006 |
| JP | 2007066265 A | 3/2007 |
| JP | 2008219266 A * | 9/2008 |
| WO | 2005069823 A2 | 8/2005 |
| WO | WO 2006065004 A1 | 6/2006 |

\* cited by examiner

NON-INTRUSIVE SINGLE SIGN-ON MECHANISM IN CLOUD SERVICES

CROSS REFERENCE TO RELATED APPLICATION

The present application is a continuation of and claims priority from U.S. application Ser. No. 13/430,746, which in turn claims priority under 35 U.S.C. 119 from Chinese Patent Application 201110080417.X, filed Mar. 31, 2011, the entire contents of both applications are incorporated herein by reference.

BACKGROUND OF THE INVENTION

1. Field of the Invention

The present invention relates to Single Sign-on, and particularly to a method and device for Single Sign-On in a cloud computing environment.

2. Description of Related Art

With the improvement of information service quality provided by intranets, users' requirements for information security are becoming more and more stronger; especially in a cloud computing environment, users obtain more and more services via a cloud computing platform such as Platform as a Service (PaaS) and Software as a Service (Saas), and hope to provide a secure and unified identity authentication and authorization management service for various information service systems on the cloud computing platform. Currently, the Single Sign-On technology is a popular identity authentication mechanism, which is an authentication and authorization mechanism between a plurality of application systems or services having mutual trust; Single Sign-On includes single sign-in and single sign-out. Single Sign-On allow a user to sign-in to or sign-out of the system only once to sign-in to or sign-out of all other connected application systems or services, without need to sign-in or sign-out again. For example, a system provides a unified platform for browser users (including IE users and FireFox users) of an intranet, enabling the user to receive services provided by other information service systems on the cloud computing platform after accomplishing identity authentication on a sign-on interface of the platform without need to sign-in again. FIG. 1 illustrates a system schematic diagram of a user's Single Sign-On in the prior art; in the system shown in FIG. 1, a user 102 accesses a cloud computing platform server 106 and web services 108 and 110 linked by a platform server page via his/her client browser 104. The user 102 signs in to the platform server 108 via a client browser to obtain the permission to access the platform server 108, and accesses the web services 108 and 110 via the platform server page links.

In the conventional Single Sign-On technology, the session life cycles of the user in various integrated applications are not synchronous; for example, the user accesses a network service 1 provided by a service provider SP1 and a network service 2 provided by a service provider SP2 via the cloud computing intranet platform, and then the user signs out from the sign-out interface of the intranet platform. Although the user has signed out from the sign-out interface of the intranet platform, since he/she has not proposed a sign-out request to be accomplished from SP1 and SP2, he/she has not signed out of SP1 and SP2 actually, and the sessions between the user and SP1 and SP2 may still be valid, thus causing the session life cycles not synchronous between the user and the system platform and applications. At this time, if another user signs on and then accesses SP1 and SP2, he/she will access the interface of the previous user, which will confuse the other user and provide an opportunity to hackers to threaten network security.

In addition, the implementation of the existing Single Sign-On requires the platform and service providers to conform to a unified programming model, while in a cloud computing environment, as user's demands are becoming more and more, it is often needed to temporally add more services; if each service provider needs to be closely coupled with the platform provider, it will require enormous human and financial resources to modify their respective code to jointly build a unified programming model to implement Single Sign-On.

Therefore, it is needed to provide to service providers and the platform a Single Sign-On method which is light-weighted, loosely coupled and non-intrusive, and make session life cycles between the platform and service providers synchronized.

SUMMARY OF THE INVENTION

The present invention provides a method and a device for Single Sign-On.

According a first aspect of the present invention, a method for Single Sign-On, wherein a user accesses a platform server and at least one service provider on the platform server, includes the steps of: intercepting a request sent by the user via a client browser; and extracting a domain name included in the request; determining the type of the domain name. In response to a determination that the domain name is an original domain name of the platform server, the method generates for uniquely identifying a session between the user and the platform server; generates a new domain name of the platform server associated with the global session ID; redirects the URL in the request to a new URL including the new domain name of the platform server; and forwards the request including the new URL of the platform server to the platform server.

According to another aspect of the present invention, a device for Single Sign-On, wherein a user accesses a platform server and at least one service provider on the platform server, includes: a request interception module configured to intercept a request sent by the user via a client browser; a domain name extracting module configured to extract a domain name included in the request; a domain name type determining module configured to determine the type of the domain name; a global session ID generating module configured to, in response to a determination by the domain type determining module that the type of the domain name is an original domain name of the platform server, generate a global session ID for uniquely identifying the session between the user and the platform server; a new domain name generating module configured to generate a new domain name of the platform server associated with the global session ID; a URL redirecting module configured to redirect the URL in the request to a new URL including the new domain name of the platform server; and a request forwarding module configured to forward the request including the new URL of the platform server to the platform server.

By employing the method and device of the present invention, a global session ID is introduced to uniformly manage the session life cycle of the platform server and service providers.

BRIEF DESCRIPTION OF THE DRAWINGS

The present invention itself, and preferred embodiments and objectives and advantages thereof will be better understood by referring to the following detailed description of exemplary embodiments in conjunction with the accompanying drawings, in which.

DETAILED DESCRIPTION OF THE PREFERRED EMBODIMENTS

The following description presents a method and device for Single Sign-On according to embodiments of the present invention in conjunction with the accompanying drawings, through which the objects and advantages of the present invention will be better understood.

The method for Single Sign-On of the present invention introduces an intermediate agent between the client browser and the platform server for intercepting all the requests sent by the user via a client browser and analyzing the intercepted requests, and generating a global session ID to manage session life cycles of the platform server and service providers to associate the domain names of the platform server and the service providers with the generated global session ID, so as to form a domain name chain associated with the global session ID to enable the session life cycles in the platform server and various applications synchronized.

Figure 1:
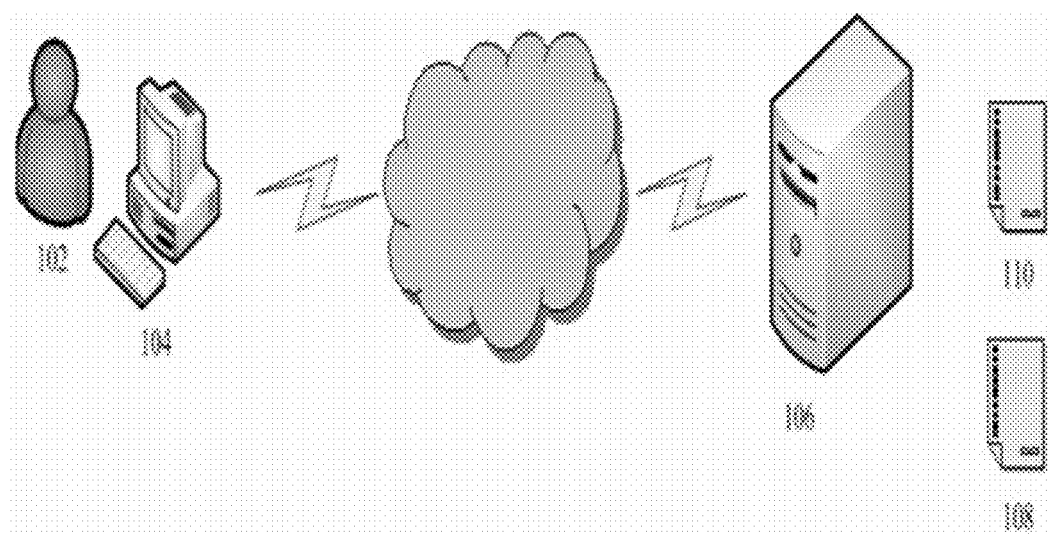
FIG. 1 is a system schematic diagram of a user's Single Sign-On in the prior art.
Figure 2:
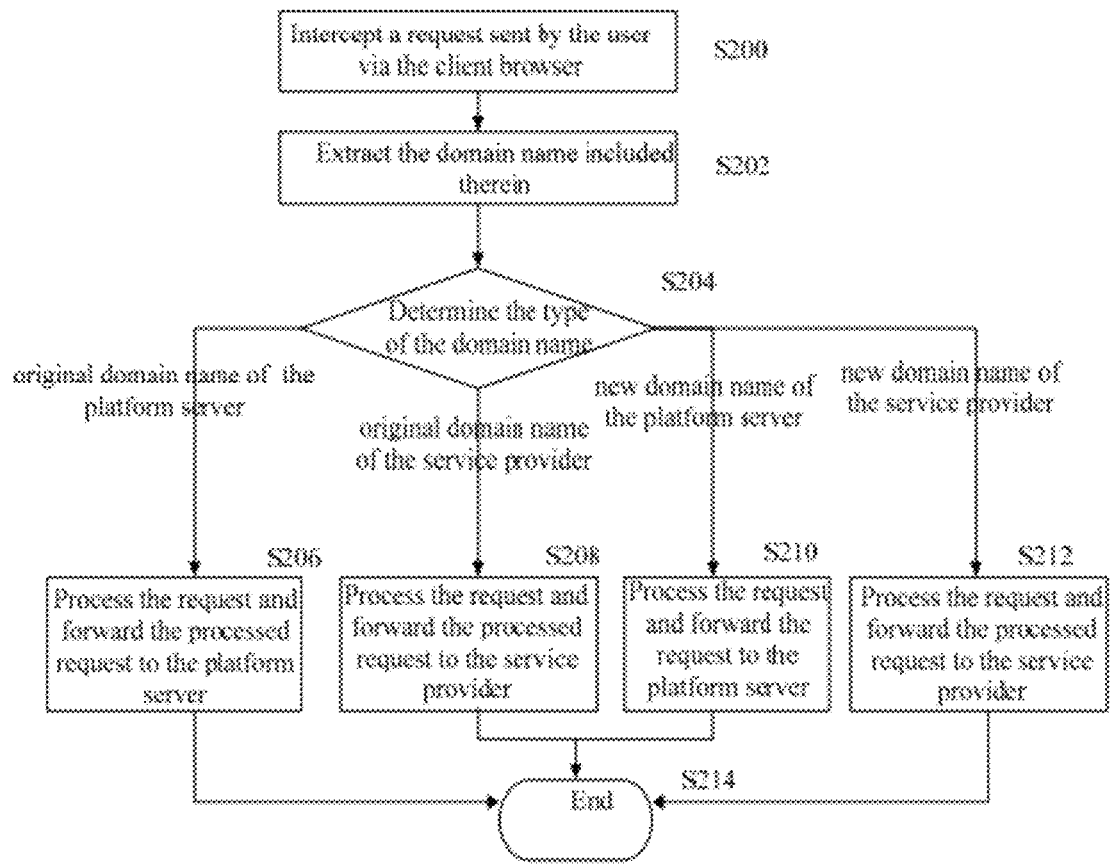
FIG. 2 illustrates a method for Single Sign-On according to an embodiment of the present invention.

FIG. 2 illustrates a method for Single Sign-On according to an embodiment of the present invention, wherein a user accesses a platform server and at least one service provider on the platform server, the method including: intercepting a request sent by the user via a client browser at step S200; extracting the domain name included in the request at step S202; determining the type of the domain name, and processing according to the type of the domain name respectively at step S204, wherein the type of the domain name includes: an original domain name of the platform server, an original domain name of the service provider, a new domain name of the platform server associated with a global session ID or a new domain name of the service provider associated with the global session ID. According to an embodiment of the present invention, the type of the domain name may be determined by utilizing information recorded in a domain name session mapping table, the information recorded in the domain name session mapping table including: a global session ID, a new domain name of the platform server associated with the global session ID, a new domain name of the service provider associated with the global session ID, state information of the session between the user and the platform server. For example, if an obtained domain name is <sid1.wdp.com>, and by querying the domain name session mapping table, it is learned that the global session ID is sid1, then it can be determined that the domain name is a new domain name of the platform server associated with the global session ID; if an obtained domain name is <www.wdp.com>, it can be determined that the domain name is an original domain name of the platform server, if an obtained domain name is <sid1.sp1.com>, it can be determined that the domain name is a new domain name of the service provider sp1 associated with the global session ID; if an obtained domain name is <www.sp1.com>, it can be determined that the domain name is an original domain name of the service provider sp1. Next, processing is preformed respectively according to the determination results.

If the results indicate that the type of the domain name is an original domain name of the platform server, then at step S206 the request is processed and the processed request is forwarded to the platform server, and the process ends. If the results indicate the domain name type is an original domain name of a service provider, then at step S208 the request is processed and the processed request is forwarded to the service provider, and the process ends. If the results indicate that the type of the domain name is a new domain name of the platform server associated with the global session ID, then processing is performed and the request is forwarded to the platform server at step S210, then the process ends. If the results indicate that the domain name type is a new domain name of a service provider associated with the global session ID, then the request is forwarded to the service provider at step S212, and the process ends.

Figure 3:
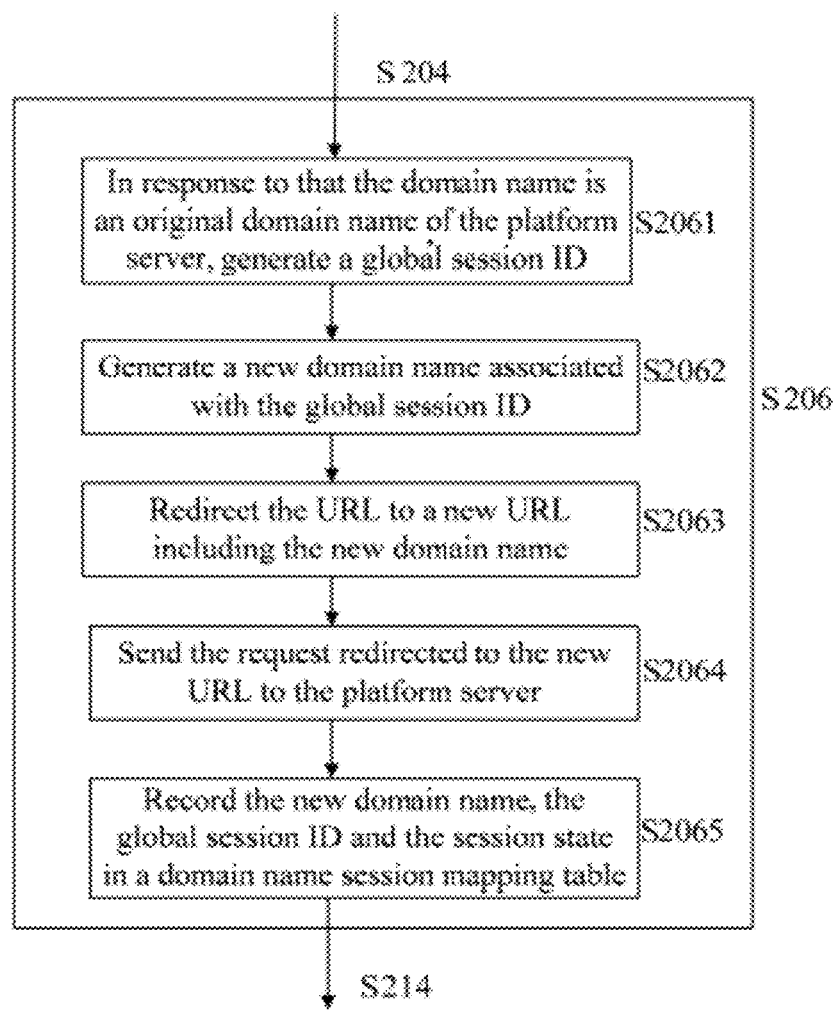
FIG. 3 illustrates a detailed implementation process of step S206 in FIG. 2.

FIGS. 3-6 illustrate the detailed implementation processes of step S206, step S208, step S210 and step S212 in FIG. 2 respectively, wherein FIG. 3 illustrates a detailed implementation process of step S206 in FIG. 2. :As shown at step S2061, in response to a determination that the domain name is an original domain name of the platform server, a global session ID is generated, the global session ID being used to uniquely identify the session between the user and the platform server; at step S2062, the method generates a new domain name of the platform server associated with the global session ID. The new domain name can be generated according to a predefined rule; according to an embodiment of the present invention, the predefined rule is to replace the "www" in the domain name with the new session ID. Thus, if the generated global session ID is sid1, the original domain name <www.wdp.com> will be transformed into <sid1.wdp.com>; those skilled in the art will appreciate that the example is not a limitation, based on which there may be a plurality of variant implementations to associate the domain name with the global session ID. At step S2063, the URL in the request is redirected to a new URL including the new domain name of the platform server, e.g., the URL http://www.wdp.com is redirected to the new URL <http://sid1.wdp.com> including the new domain name; at step S2064, forwarding the request redirected to the new URL to the platform server; at step S2065, recording the new domain name, the global session ID and the state information of the session between the user and the platform server in the domain name session mapping table, and the process ends. Table 1 illustrates an example of the domain name session mapping table.

TABLE 1

| Domain name | Global session ID | Session active state |
|---|---|---|
| sid1.wdp.com | sid1 | active and valid |
| sid1.sp1.com | sid1 | active and valid |
| sid1.sp2.com | sid1 | active and valid |

Figure 4:
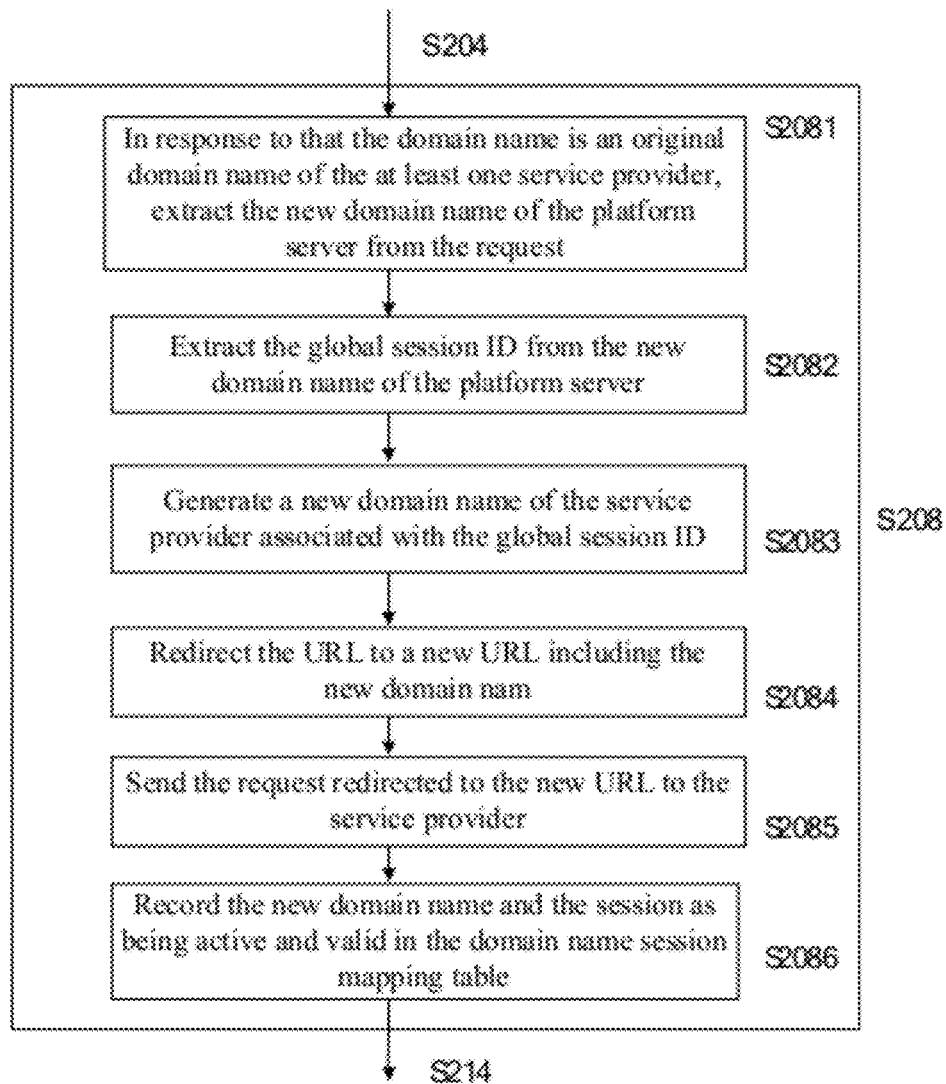
FIG. 4 illustrates a detailed implementation process of step S208 in FIG. 2.

FIG. 4 illustrates a detailed implementation process of step S208 in FIG. 2, including: at step S2081, in response to that the domain name is an original domain name of the at least one service provider, extracting a new domain name of the platform server associated with the global session ID; since the user accesses the service provider via a link provided by the platform server, according to FIG. 3 of the present invention, when the user requests to sign-in to the platform server, the original domain name of the platform server will be transformed to the new domain name associated with the global session ID, thus the new domain name of the platform server can be extracted from the Referer field of the request; at step S2082, extracting the global session ID from the new domain name of the platform server; at step S2083, generating a new domain name of the at least one service provider associated with the global session ID; the new domain name of the service provider can be generated according to a predefined rule, for example, if the generated global session ID is sid1, the original domain name <www.sp1.com> of the service provide SP1 is transformed to <sid1.sp1.com>; at step S2084, redirecting the URL accessing the at least one service provider to a new URL including the new domain name of the at least one service provider, e.g., redirecting the URL <http://www.sp1.com> to the new URL <http://sid1.sp1.com> including the new domain name; at step S2085, forwarding the request including the new URL accessing the at least one service provider to the at least one service provider. According to an embodiment of the present invention, the process further includes recording the new domain name of the service provider, as well as the state information of the session between the user and the service provider in the domain name session mapping table, as shown in Table 1.

Figure 5:
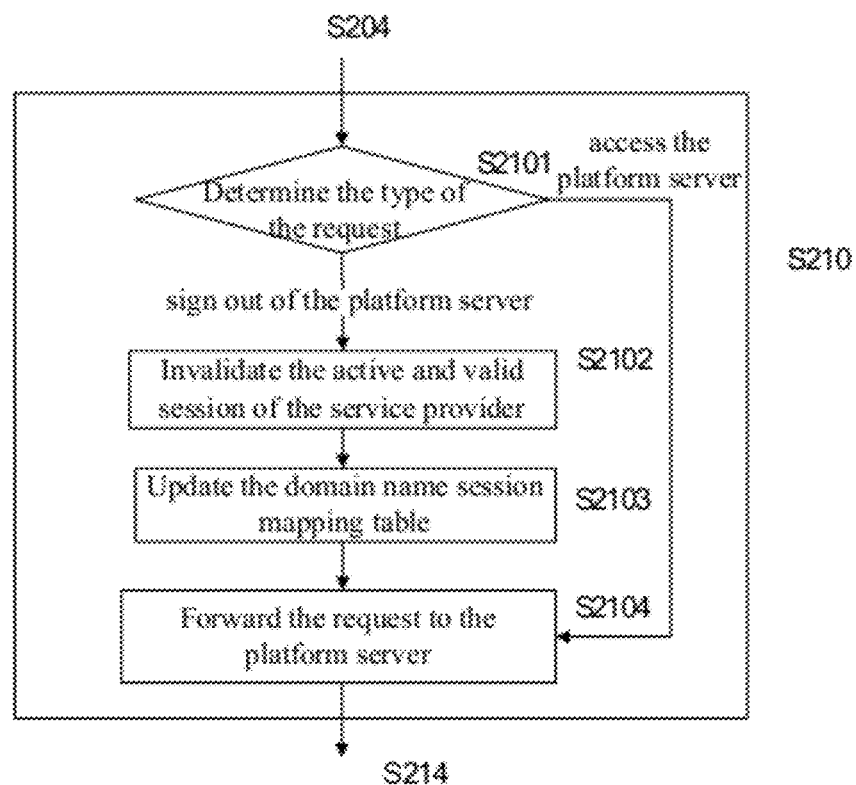
FIG. 5 illustrates a detailed implementation process of step S210 in FIG. 2.

FIG. 5 illustrates a detailed implementation process of step S210 in FIG. 2, including: at step 2101, in response to that the domain name is a new domain name of the platform server associated with a global session ID, determining the type of the request; if the type of the request is not that of signing out of the platform server, proceeding to step S2104 to forward the request to the platform server; if the type of the request is that of signing out of the platform server, invalidating the active and valid session between the user and the service provider associated with the global session ID, wherein it may be learned whether there is active and valid session of the service provider associated with the global session ID by querying the domain name session mapping table, e.g., it may be queried that there is an active and valid session between the user and the service providers SP1 and SP2 that is associated with the global session ID in Table 1; at step S2103, updating the session state information recorded in the domain name session mapping table, and modifying the state of the previously active and valid session of SP1 and SP2 as invalid; then proceeding to step S2104 to forward the request to the platform server.

Figure 6:
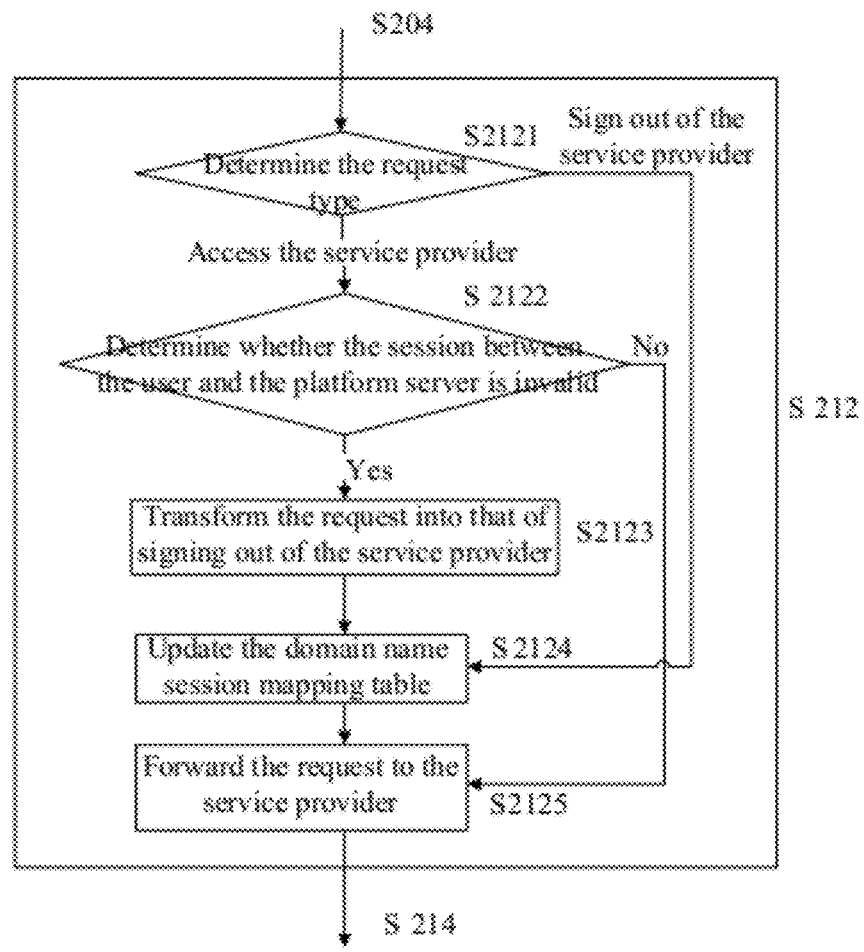
FIG. 6 illustrates a detailed implementation process of step S212 in FIG. 2.

FIG. 6 illustrates a detailed implementation process of step S212 in FIG. 2, including: at step 2121, in response to that the domain name is a new domain name of the service provider associated with a global session ID, determining the type of the request; if the type of the request is that signing out of the service provider, proceeding to step S2124 to update the state information of the session between the user and the service provider in the domain name session mapping table; and at step S2125, forwarding the request to the service provider; if the type of the request is accessing the service provider, further determining whether the session between the user and the platform server associated with the global session ID is invalid at step S2122, wherein it may be determined whether the session between the user and the platform server associated with the global session ID is invalid by querying the domain name session mapping table; if the session between the user and the platform server is invalid, proceeding to step S2123 to transform the request to that of signing-out of the service provider; and at step S2124, updating the domain name session mapping table, i.e., changing the active and valid state information of the session between the user and the service provider to invalid; proceeding to step S2125 to forward the transformed request to the service provider; if the session between the user and the platform server is active and valid, proceeding to step S2125 to forward the request to the service provider.

Figure 7:
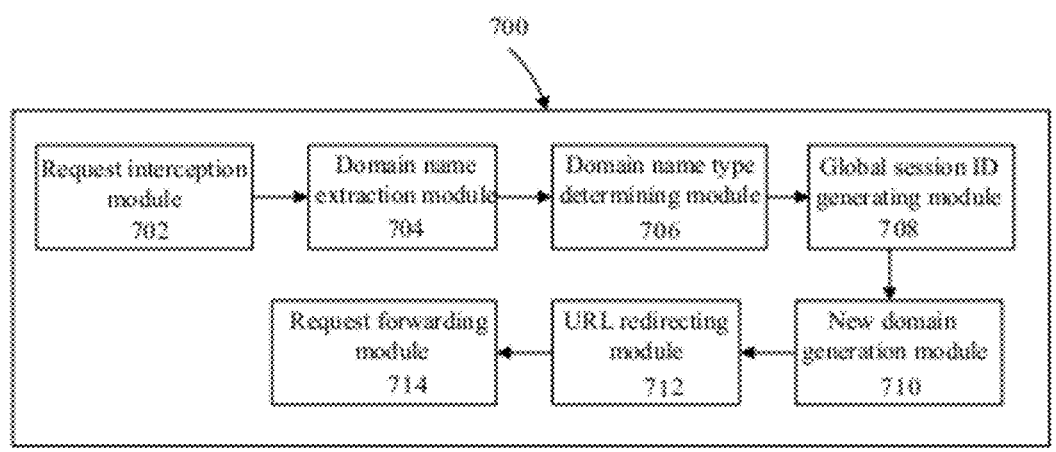
FIG. 7 illustrates a device 700 for Single Sign-On according to an embodiment of the present invention.

The present invention provides a device for Single Sign-On base on the same inventive concept, wherein a user accesses the platform server and accesses at least one service provider on the platform server via Single Sign-On. FIG. 7 illustrates a device 700 for Single Sign-On according to an embodiment of the present invention, including: a request interception module 702 configured to intercept a request sent by a user via a client browser; a domain name extracting module 704 configured to extract a domain name included in the request; a domain name type determining module 706 configured to determine the type of the domain name; a global session ID generating module 708 configured to, in response to that the type of the domain name is an original domain name of the platform server, generate a global session ID; a new domain name generating module 710 configured to generate a new domain name of the platform server associated with the global session ID; a URL redirecting module 712 configured to redirect the URL in the request to a new URL including the new domain name of the platform server; a request forwarding module 714 configured to forward the request redirected to the new URL to the platform server.

According to an embodiment of the present invention, the device for Single Sign-On of the present invention further includes a recording module configured to record the new domain name of the platform server, the global session ID and the state information of the session between the user and the platform server in a domain name session mapping table.

According to an embodiment of the present invention, the device for Single Sign-On of the present invention further includes a global session ID extracting module configured to, in response to that the results indicate that the domain name is an original domain name of the at least one service provider, extract the new domain name of the platform server associated with the global session ID from the request, and extract the global session ID from the new domain name of the platform server; wherein the new domain name generating module is further configured to generate a new domain name of the at least one service provider associated with the global session ID; the URL redirecting module is further configured to redirect the URL accessing the at least one service provider to the new URL including the new domain name of the at least one service provider; the request forwarding module is further configured to forward the request including the new URL of the at least one service provider to the at least one service provider.

According to an embodiment of the present invention, the recording module is further configured to: record the new domain name of the at least one service provider, the global session ID and the state information of the session between the user and the service provider in the domain name session mapping table.

According to an embodiment of the present invention, the device for Single Sign-On of the present invention further includes: a request type determining module configured to, in response to that the type of the domain name is a new domain name of the platform server associated with a global session ID, determine the type of the request; a session invalidating module configured to, in response to that the request type is that of signing out of the platform server, invalidate the active and valid session between the user and the service provider associated with the global session ID.

According to embodiment of the present invention, the recording module is further configured to: update the state information of the session between the user and the platform server and the session between the user and the service provider that are recorded in the domain name session mapping table.

According to an embodiment of the present invention, the request type determining module is further configured to, in response to that the type of the domain name is a new domain name of a service provider associated with a global session ID, determine the type of the request; a session state querying module is further configured to, in response to that the request type is accessing a service provider, determine whether the session between the user and the platform server associated with the global session ID is invalid; the request forwarding module is further configured to, in response to that the session between the user and the platform server is invalid, transform the request into that of signing out of the service provider and forward the transformed request to the service provider.

According to an embodiment of the present invention, the recording module is further configured to update the state information of the session between the user and the service provider recorded in the domain name session mapping table from active and valid to invalid.

Figure 8:
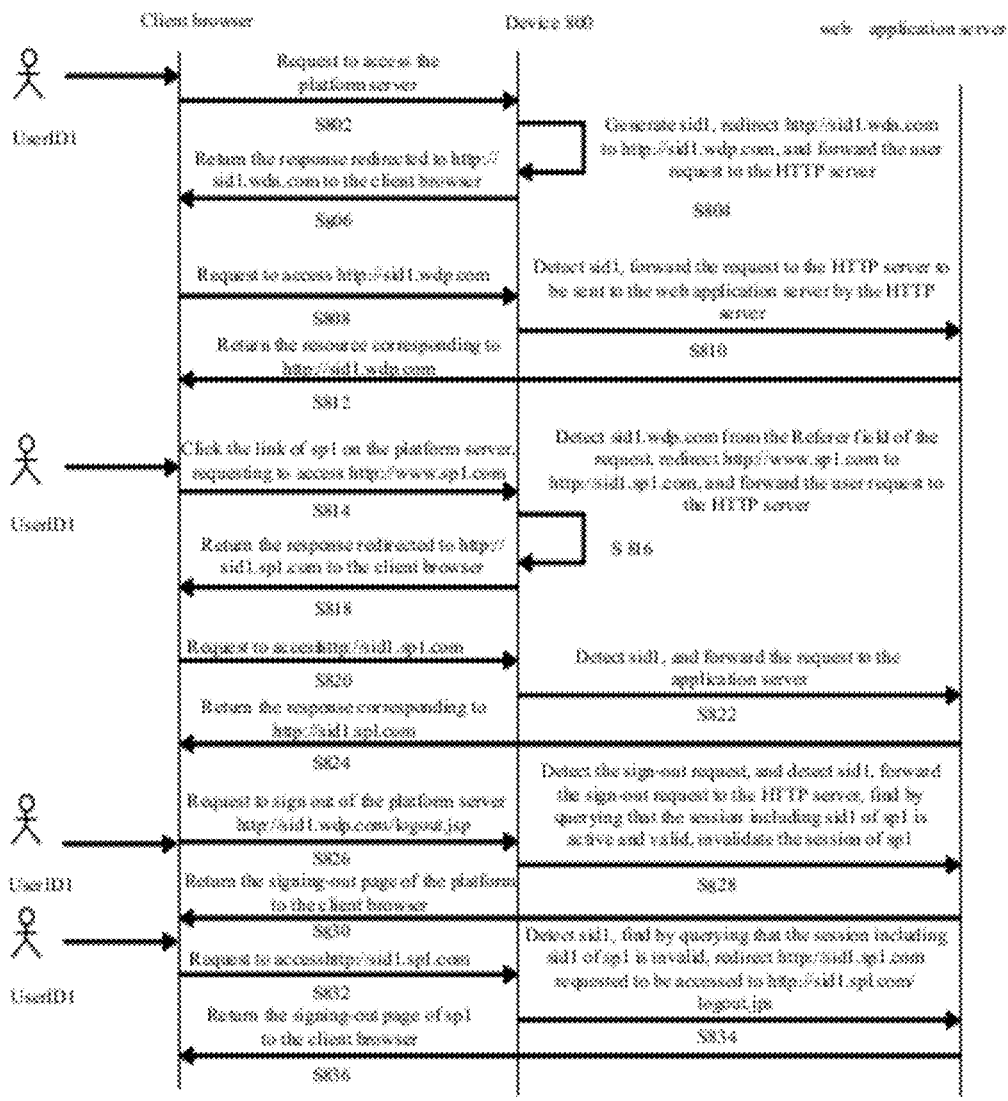
FIG. 8 illustrates the process of Single Sign-On according to an embodiment of the present invention.

FIG. 8 illustrates a process of Single Sign-On according to an embodiment of the present invention. The applicant emphasizes that the embodiment is only for illustrative purpose and should not be construed as limitation to the protection scope of the present invention. In FIG. 8, the user can access the resource of the platform server via his/her client browser and access network services provided by a plurality of service providers SPs through the platform server. The device 800 of the present invention resides on an http server between the client browser and a web application server.

At step S802, the user requests to access the resource of the platform server, http://www.wdp.com, via the client browser.

At step S804, according to an embodiment of the present invention, the device 800 intercepts the request, extracts the domain name included in the request, and determines the type of the domain name, and in response to the domain name is the original domain name of the platform server, generates a global session ID<sid1> that uniquely identifies the current session, and generates a new domain name <sid1.wdp.com> of the platform server associated with the global session ID<sid1>, redirects the URL <http://www.wdp.com> to the new URL <http://sid1.wdp.com> that includes the new domain name, and forwards the user request to the http server; and records the new domain name of the platform server, the global session ID and the active and valid state of the session in the domain name session mapping table 2.

TABLE 2

| Domain name | Global session ID | Session active state |
|---|---|---|
| sid1.wdp.com | sid1 | Active and valid |

At step S806, the http server processes the user request, and returns the response redirected to <http://sid1.wdp.com> to the client browser; according to an embodiment of the present invention, an HTTP307 response is returned to the client browser to redirect the request to <http://sid1.wdp.com>, the response being typically shown as follows:

HTTP 307 Temporary Redirect
Location: <http://sid1.wdp.com>

At step S808, after receiving the response redirected to <http://sid1.wdp.com>, the client browser requests to access the address designated in the response, and at this time the request is typically shown as follows: GET<http://sid1.wdp.com>.

At step S810, at this time, the device 800 intercepts the request again, analyzes the user request and extracts the domain name <sid1.wdp.com>, and by querying the domain name session mapping table 2 learns that the domain name is a new domain name of the platform server associated with the global session ID, and therefore forwards the request to the HTTP server to be transmitted to the web application server by the HTTP server.

At step S812, the web application server, after receiving the user request, responds thereto, returning the requested resource http://sid1.wdp.com to the client browser.

At step S814, assume that the user clicks a link in the page corresponding to the URL <http://sid1.wdp.com> of the platform server to request to access the network service resource <http://www.sp1.com> of the service provider SP1.

At step S816, intercepting the request and extracting the domain name www.sp1.com, determining that the domain name is the original domain name of the service provider sp1, extracting the new domain name <sid1.wdp.com> of the platform server from the Referer header field, since according to the HTTP protocol, the current request will include a Referer header field to indicate the source of the resource accessed by the service provider SP1, <http://www.sp1.com>. Since the webpage address corresponding to the platform server is redirected to <http://sid1.wdp.com>, a typical request is shown as follows:

GET <http://www.sp1.com>
. . .
Referer: <http://sid1.wdp.com>
. . .

Extracting the global session ID<sid1> from the new domain name <sid1.wdp.com> of the platform server, generating the new domain name <sid1.sp1.com> of the service provider SP1, and redirecting the URL <http://www.sp1.com> of the service provider SP1 to <http://sid1.sp1.com>, and forwarding the user request to the HTTP server, and recording the new domain name of the service provider SP1, the global session ID and the active and valid state of the session in the domain name session mapping table 3.

TABLE 3

| Domain name | Global session ID | Active state of session |
|---|---|---|
| sid1.wdp.com | sid1 | Active and valid |
| sid1.sp1.com | sid1 | Active and valid |

At step S818, the http server processes the user request, and returns the response redirected to <http://sid1.sp1.com> to the client browser.

At step S820, after receiving the response redirected to <http://sid1.sp1.com>, the client browser requests to access the address designated in the response; at this time the request is typically shown as follows: GET <http://sid1.sp1.com>.

At step S822, the device 500 intercepts the request again, extracts the domain name <sid1.sp1.com>, and by querying the domain name session mapping table 3 learns that the domain name is a domain name associated with the global session ID, and forwards the request to the HTTP server to be transmitted to the web application server by the HTTP server.

At step S824, after receiving the user request, the web application server responds thereto, returning the requested resource <http://sid1.sp1.com> to the client browser.

At step S826, the user clicks the platform server sign-out link http://sid1.wdp.com/logout.jsp, to request to sign out of the platform server.

At step S528, the device 800 intercepts the request, extracts the domain name <sid1.wdp.com>, determines that the domain name is a new domain name of the platform server, and further determines that the request is a request to sign out of the platform server, and by querying the domain name session mapping table 3, learns that there is an active and valid session of the service provider SP1 associated with sid1, therefore invalidates the session of SP1, and forwards the sign-out request to the HTTP server to be transmitted to the web application server by the HTTP server, and updates the session state of the platform server and SP1 in the domain mapping table 3 from active and valid to invalid to obtain Table 4.

TABLE 4

| Domain name | Global session ID | Session active state |
| --- | --- | --- |
| sid1.wdp.com | sid1 | invalid |
| sid1.sp1.com | sid1 | invalid |

At step S830, after receiving the user request, the web application server responds thereto, returning the sign-out webpage of the platform server to the client browser.

At step S832, the user accesses the network service resource <http://sid1.sp1.com> of the service provider SP1 by clicking the link on the platform server webpage.

At Step S834, the device 800 intercepts the request, extracts the domain name <sid1.sp1.com>, learns by querying the domain name session mapping table that the domain name is a new domain name of SP1 associated with the global session ID, and find by querying that the session of SP1 is invalid, therefore redirects the URL <http://sid1.sp1.com> requested to be accessed to the sign-out URL <http://sid1.sp1.com/logout.jsp> of the service, and forwards the sign-out request to the HTTP server to be transmitted to the web application server by the HTTP server.

At step S836, after receiving the user request, the web application server responds thereto, returning the sign-out page of SP1 to the client browser.

Thus, session synchronization between the user and the platform server as well as the service providers is uniformly managed by utilizing the global session ID; although the user only signs out from the website of the platform server, he/she actually signs out of all the active and valid service provider websites thereon. Therefore, the problems of repeated jumps to sign-out pages of different applications or forgetting to sign out of some applications will not occur, and user experience will be better and security will be enhanced.

At least some aspects of the present invention may be alternatively implemented by a program product. The program defining the functions with respect to the present invention may be transmitted to a data storage system or computer system via various signal carrying mediums, the signal carrying mediums including but not limited to non-writable storage medium (e.g., CD-ROM), writable storage medium (e.g., floppy disk, hard disk drive, read/write CD ROM, optical medium) and communication mediums such as computer and telephone networks including Ethernet and so on. Therefore it should be appreciated that, such signal carrying mediums, when carrying or being encoded with computer readable instructions managing the method functions of the present invention, represents an alternative embodiment of the present invention. The present invention may be realized in manner of hardware, software, firmware or a combination thereof. The present invention may be implemented in one computer system in a centralized manner or in a distributed manner, in which different components are distributed in several interconnected computer systems. Any computer systems or other devices suitable for executing the method described herein are appropriate. Preferably, the present invention is implemented by means of a combination of computer software and general computer hardware, in which a computer program, when being loaded and executed by a processor, controls the computer system to execute the method of the present invention, or to constitute the system of the present invention.

Descriptions of the preferred embodiments of the present invention are presented above for the purpose of illustration. The above description of the preferred embodiments is neither exhaustive, nor intended to limit the present invention to the disclosed explicit form; obviously in view of the above teachings, many modifications and variations are possible. Such modifications and variations, which are obvious to those skilled in the art, are within the scope of the present invention defined by the appended claims.

The invention claimed is:

1. A method for Single Sign-On, wherein a user accesses a platform server and at least one service provider on the platform server, the method comprising:
    intercepting a request sent by the user via a client browser;
    extracting a domain name included in the request;
    determining a type of the domain name;
    in response to a determination that the type of the domain name is an original domain name of the at least one service provider, extracting a new domain name of the platform server associated with a global session ID from the request;
    extracting the global session ID from the new domain name of the platform server;
    in response to a determination that the type of the domain name is an original domain name of the platform server, generating the global session ID for uniquely identifying a session between the user and the platform server;
    generating the new domain name of the platform server associated with the global session ID and a new domain name of the at least one service provider associated with the global session ID;
    redirecting a URL in the request to a new URL including the new domain name of the platform server and a URL accessing the at least one service provider to a new URL including the new domain name of the at least one service provider;
    forwarding the request including the new URL of the platform server to the platform server and the request including the new URL of the at least one service provider to the at least one service provider; and
    recording the new domain name of the platform server, the global session ID and state information of the session between the user and the platform server in a domain name session mapping table.

2. The method of claim 1, further comprising: in response to a determination that the type of the domain name is a new domain name of the platform server associated with the global session ID, determining the request type;

in response to a determination that the request type is that of signing out of the platform server, invalidating the active and valid session between the user and the service provider associated with the global session ID.

3. The method of claim 2, further comprising:
updating the state information of the session between the user and the platform server and that between the user and the service provider recorded in the domain name session mapping table.

4. The method of claim 1, further comprising: recording the new domain name of the at least one service provider and state information of the session between the user and the service provider in the domain name session mapping table.

5. The method of claim 1, further comprising: in response to a determination that the type of the domain name is a new domain name of a service provider associated with the global session ID, determining the request type;
in response to a determination that the request type is accessing the service provider, determining whether the session between the user and the platform server associated with the global session ID is invalid;
in response to a determination that the session between the user and platform server is invalid, transforming the request into that of signing out of the service provider; and
forwarding the transformed request to the service provider.

6. A device for Single Sign-On, wherein a user accesses a platform server and at least one service provider on the platform server, the device comprising:
at least one processor coupled to a memory;
a request interception module configured to intercept a request sent by the user via a client browser, wherein the request interception module is stored to a memory and executed by a processor;
a domain name extracting module configured to extract a domain name included in the request, wherein the domain name extracting module is stored to a memory and executed by a processor;
a domain name type determining module configured to determine a type of the domain name, wherein the domain name type determining module is stored to a memory and executed by a processor;
a global session ID generating module configured to generate, in response to a determination by the domain name type determining module that the type of the domain name is an original domain name of the platform server, a global session ID for uniquely identifying a session between the user and the platform server, wherein the global session ID generating module is stored to a memory and executed by a processor;
a new domain name generating module configured to generate a new domain name of the platform server associated with the global session ID, wherein the new domain name generating module is stored to a memory and executed by a processor;
a URL redirecting module configured to redirect a URL in the request to a new URL including the new domain name of the platform server, wherein the URL redirecting module is stored to a memory and executed by a processor;
a request type determining module configured to determine a request type, in response to a determination by the domain name type determining module that the type of the domain name is a new domain name of the service provider associated with the global session ID, wherein the request type determining module is stored to a memory and executed by a processor;
a session state querying module configured to determine, in response to a determination by the request type determining module that the request type is that of accessing the service provider, whether the session between the user and the platform server associated with the global session ID is invalid, wherein the session state querying module is stored to a memory and executed by a processor; and
a request forwarding module configured to forward the request including the new URL of the platform server to the platform server and, in response to a determination by the session state querying module that the session between the user and the platform server is invalid, to transform the request into that of signing out of the service provider and forward the transformed request to the service provider, wherein the request forwarding module is stored to a memory and executed by a processor; and
a recording module configured to record the new domain name of the platform server, the global session ID and state information of the session between the user and the platform server in a domain name session mapping table, wherein the recording module is stored to a memory and executed by a processor.

7. The device of claim 6, wherein the recording module is further configured to:
update the state information of the session between the user and the service provider recorded in the domain name session mapping table from active and valid to invalid.

8. A device for Single Sign-On,
wherein a user accesses a platform server and at least one service provider on the platform server, the device comprising:
at least one processor coupled to a memory;
a request interception module configured to intercept a request sent by the user via a client browser, wherein the request interception module is stored to a memory and executed by a processor;
a domain name extracting module configured to extract a domain name included in the request, wherein the domain name extracting module is stored to a memory and executed by a processor;
a domain name type determining module configured to determine a type of the domain name, wherein the domain name type determining module is stored to a memory and executed by a processor;
a global session ID extracting module configured to extract, in response to a determination by the domain name type determining module that the type of the domain name is an original domain name of the at least one service provider, a new domain name of the platform server associated with a global session ID from the request and the global session ID from the new domain name of the platform server, wherein the global session ID extracting module is stored to a memory and executed by a processor;
a global session ID generating module configured to generate, in response to a determination by the domain name type determining module that the type of the domain name is an original domain name of the platform server, the global session ID for uniquely identifying a session between the user and the platform server, wherein the global session ID generating module is stored to a memory and executed by a processor;
a new domain name generating module configured to generate the new domain name of the platform server associated with the global session ID and a new domain name of the at least one service provider associated with the global session ID, wherein the new domain name generating module is stored to a memory and executed by a processor;

a URL redirecting module configured to redirect a URL in the request to a new URL including the new domain name of the platform server and a URL accessing the at least one service provider to a new URL including the new domain name of the at least one service provider, wherein the URL redirecting module is stored to a memory and executed by a processor;

a request forwarding module configured to forward the request including the new URL of the platform server to the platform server and the request including the new URL of the at least one service provider to the at least one service provider, wherein the request forwarding module is stored to a memory and executed by a processor;

a recording module configured to record the new domain name of the platform server, the global session ID and state information of the session between the user and the platform server in a domain name session mapping table, wherein the recording module is stored to a memory and executed by a processor.

9. The device of claim 8, wherein the recording module is further configured to:

record the new domain name of the at least one service provider, the global session ID and the state information of the session between the user and the service provider in the domain name session mapping table.

10. A device for Single Sign-On, wherein a user accesses a platform server and at least one service provider on the platform server, the device comprising:

at least one processor coupled to a memory;

a request interception module configured to intercept a request sent by the user via a client browser, wherein the request interception module is stored to a memory and executed by a processor;

a domain name extracting module configured to extract a domain name included in the request, wherein the domain name extracting module is stored to a memory and executed by a processor;

a domain name type determining module configured to determine a type of the domain name, wherein the domain name type determining module is stored to a memory and executed by a processor;

a global session ID generating module configured to generate, in response to a determination by the domain name type determining module that the type of the domain name is an original domain name of the platform server, a global session ID for uniquely identifying a session between the user and the platform server, wherein the global session ID generating module is stored to a memory and executed by a processor;

a new domain name generating module configured to generate a new domain name of the platform server associated with the global session ID, wherein the new domain name generating module is stored to a memory and executed by a processor;

a URL redirecting module configured to redirect a URL in the request to a new URL including the new domain name of the platform server, wherein the URL redirecting module is stored to a memory and executed by a processor;

a request forwarding module configured to forward the request including the new URL of the platform server to the platform server, wherein the request forwarding module is stored to a memory and executed by a processor;

a recording module configured to record the new domain name of the platform server, the global session ID and state information of the session between the user and the platform server in a domain name session mapping table, wherein the recording module is stored to a memory and executed by a processor;

a request type determining module configured to determine a request type, in response to a determination by the domain name type determining module that the type of the domain name is a new domain name of the platform server associated with the global session ID, wherein the request type determining module is stored to a memory and executed by a processor; and a session invalidating module configured to invalidate, in response to a determination by the request type determining module that the request type is signing out of the platform server, an active and valid session between the user and the service provider associated with the global session ID, wherein the session invalidating module is stored to a memory and executed by a processor.

11. The device of claim 10, wherein the recording module is further configured to:

update the state information of the session between the user and the platform server and the session between the user and the service provider recorded in the domain name session mapping table.

* * * * *